US012663065B2

(12) United States Patent
Volak et al.

(10) Patent No.: US 12,663,065 B2
(45) Date of Patent: Jun. 23, 2026

(54) RADIAXIAL BEARING AND ELECTRIC MOTOR

(71) Applicant: BIATEC MOTION s.r.o., Bratislava (SK)

(72) Inventors: Miroslav Volak, Kosice (SK); Jozef Barna, Presov (SK)

(73) Assignee: BIATEC MOTION s.r.o., Bratislava (SK)

( * ) Notice: Subject to any disclaimer, the term of this patent is extended or adjusted under 35 U.S.C. 154(b) by 77 days.

(21) Appl. No.: 18/397,597

(22) Filed: Dec. 27, 2023

(65) Prior Publication Data

US 2024/0125350 A1 Apr. 18, 2024

Related U.S. Application Data

(63) Continuation of application No. PCT/EP2022/066518, filed on Jun. 16, 2022.

(30) Foreign Application Priority Data

Jun. 29, 2021 (EP) .................................... 21182463

(51) Int. Cl.
*F16H 49/00* (2006.01)

(52) U.S. Cl.
CPC ........ *F16H 49/001* (2013.01); *F16C 2380/26* (2013.01)

(58) Field of Classification Search
CPC ....... F16H 49/001; B25J 9/1025; F16C 19/14; F16C 19/16; F16C 19/34; F16C 19/36; F16C 19/50; F16C 2380/26
See application file for complete search history.

(56) References Cited

U.S. PATENT DOCUMENTS 6,186,922 B1 2/2001 Bursal et al.
9,897,189 B2 * 2/2018 Liang .................... F16H 49/001
(Continued)

FOREIGN PATENT DOCUMENTS

EP 3135954 A1 3/2017
EP 3366937 A1 8/2018
(Continued)

OTHER PUBLICATIONS

English translation of WO 2010131993 A1 (Year: 2010).*
International Search Report dated Sep. 26, 2022 filed in PCT/EP2022/066518.

*Primary Examiner* — Joseph Brown
(74) *Attorney, Agent, or Firm* — Rankin, Hill & Clark LLP

(57) ABSTRACT

Radiaxial bearing having a cylindrical configuration centered on a central axis, the bearing having at least one harmonic wave-type reduction stage and including three or more rings and a first ring-shaped arrangement of rolling elements, each being centered on the central axis, the three or more rings enclosing the ring-shaped arrangement of rolling elements such that a) an innermost of the rings has a race in contact with the rolling elements from radially inward, an outermost of the rings has a race in contact with the rolling elements from radially outward, and a third ring, and possibly a fourth ring, has or have a race or races in contact with the rolling elements axially from both sides, or b) the three or more rings have four races contacting the rolling elements in a rectangular box formation, the box formation being oriented at an oblique angle with respect to the central axis of between 0° and 360°, wherein two opposed races have structures with different spatial frequencies that are designed to force the rolling elements into a harmonic-wave type oscillation between the structured races and translating a fast rotation of a ring with a structured race (Continued)

having a low spatial frequency into a slow rotation of a ring having a race with a high spatial frequency during operation of the bearing, wherein the ring or one of the rings that has or have the races that are oriented perpendicular to the structured races has separators separating adjacent rolling elements from one another, and to an electric motor. At least one of the structured races is structured such as to form an obstruction having at least one curve oscillating in a direction perpendicular to the direction of the rolling elements and contacting the rolling elements off-center such that the rolling elements partially protrude beyond the obstruction by varying amounts.

14 Claims, 8 Drawing Sheets

(56)                References Cited

U.S. PATENT DOCUMENTS

| | | | |
|---|---|---|---|
| 2016/0017915 A1* | 1/2016 | Bussit | F16C 33/60 |
| | | | 29/898.061 |
| 2017/0063193 A1* | 3/2017 | Volak | F16C 19/48 |
| 2019/0003567 A1* | 1/2019 | Genovese | F16C 33/60 |
| 2021/0273413 A1 | 9/2021 | Park et al. | |

FOREIGN PATENT DOCUMENTS

| | | | |
|---|---|---|---|
| WO | 2010114426 A2 | 10/2010 | |
| WO | 2010131993 A1 | 11/2010 | |
| WO | 2020005005 A1 | 1/2020 | |

* cited by examiner

Fig. 1
(PRIOR ART)
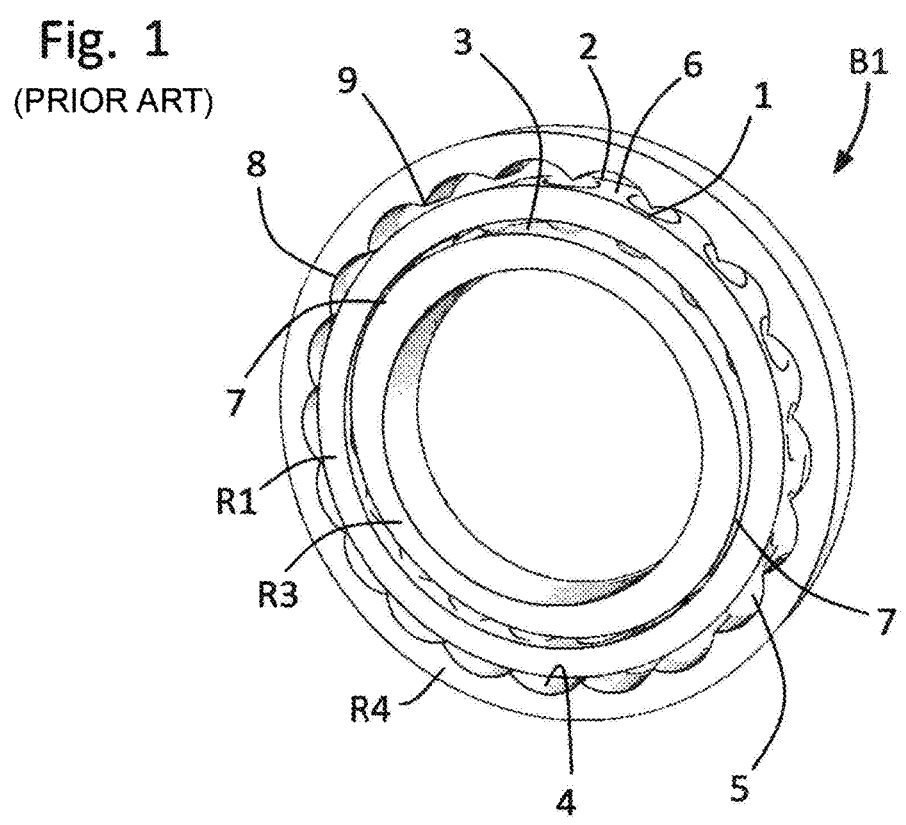
Fig. 2.1
(PRIOR ART)
Fig. 2.2
(PRIOR ART)
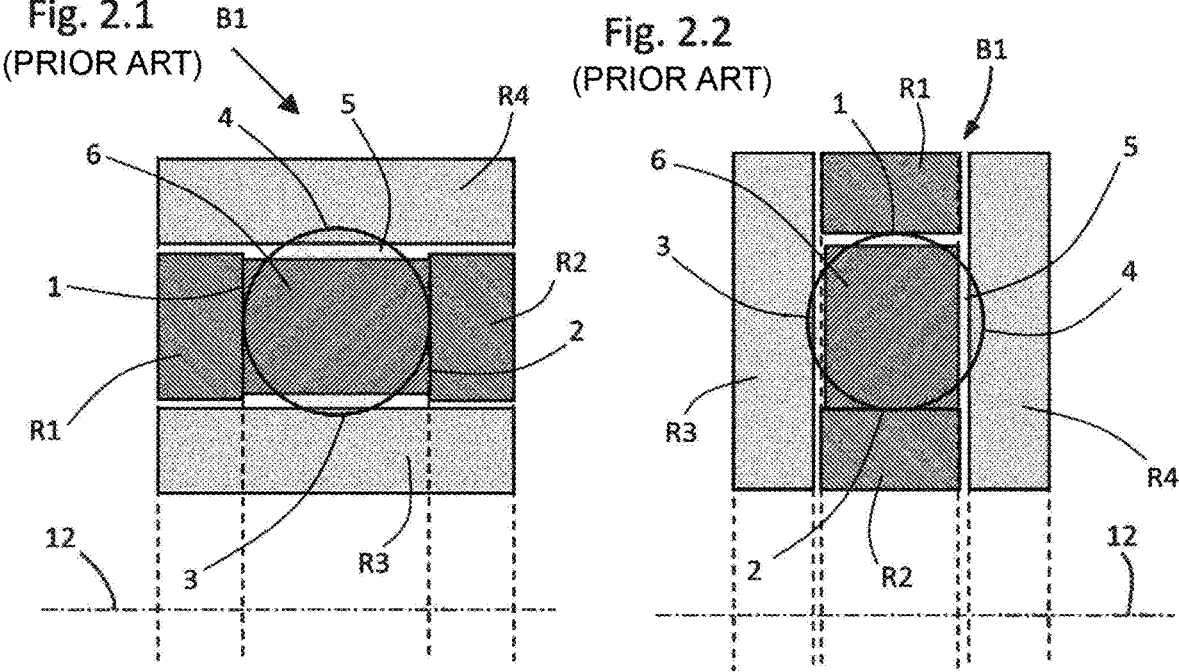

RADIAXIAL BEARING AND ELECTRIC MOTOR

CROSS-REFERENCE TO RELATED APPLICATIONS

This application is a continuation of International Application No. PCT/EP2022/066518, filed Jun. 16, 2022, and claims priority to European Patent App. No. 21182463.6, filed Jun. 29, 2021.

BACKGROUND OF INVENTION

Field of Invention

The present invention relates to a radiaxial bearing having a cylindrical configuration centered on a central axis, the bearing having at least one harmonic wave-type reduction stage and including three or more rings and a first ring-shaped arrangement of rolling elements, each being centered on the central axis, as well as an electric motor.

Brief Description of Related Art

Radial bearings with concentric rings interposed with concentric rings of rolling elements are used to take up radial forces while allowing rotational movement of rotating parts around a common central axis of the bearing. Also, gearboxes are known which reduce a rotating speed of a rotating element at an input of the gearbox into a slower rotation at an output of the gearbox. Within the present application, this is called a reduction action.

Commonly known gearboxes themselves are not capable of or ill-suited to bearing radial forces and are therefore usually used in combination with external or additional radial bearings. Many technical applications require reducing action but are faced with the problem that commonly known gearboxes in combination with bearings are prohibitively large. One such field of technology is robotics, which has a particularly strong need for miniaturization combined with robust and precise rotary speed reduction. Another field of technology, in which the subject matter disclosed herein can be used, is automotive, especially electric cars and electric wheels.

European patent application EP 3 135 954 A1 discloses a reduction bearing integrating the reduction action into radial bearing. The reduction bearing has at least three concentric rings configured as bearing races for two concentric rings of rolling elements such that the three concentric rings are freely rotatable against each other while bearing radial forces. This is combined with the integration of a harmonic wave-type reduction stage into extensions of the at least three concentric rings, which is based on the known harmonic wave-type reduction principle. The harmonic wave-type action is made possible by radial displacement of rolling elements between specially structured inner and outer surfaces of the outer and inner rings, respectively.

More recently, European patent application EP 3 366 937 A1 disclosed a reduction bearing in a ring-shaped configuration with an inner ring, a center ring and an outer ring, as well as a first ring of rolling elements and a second ring of rolling elements, centered on a central axis of rotational symmetry. The first and second rings of rolling elements are in axial alignment with each other and located between the inner ring and the outer ring. The inner ring and the outer ring are configured as having bearing races for both of the two rings of rolling elements in a radial direction, wherein the reduction bearing is configured to transmit a wave-type reduction action between the center ring and either the inner ring or the outer ring via axial displacement of the rolling elements of at least one of the two rings of rolling elements. Some of the bearings disclosed in EP 3 366 937 A1 have radiaxial bearing characteristics, meaning that they act as radial bearings as well as axial bearings.

The present invention discloses improvements to these known bearings, thereby providing for smaller sized bearings that include a reduction function and radiaxial bearing characteristics.

BRIEF SUMMARY OF THE INVENTION

In a first embodiment, the improvements are achieved by a radiaxial bearing having a cylindrical configuration centered on a central axis, the bearing having at least one harmonic wave-type reduction stage and including three or more rings and a first ring-shaped arrangement of rolling elements, each being centered on the central axis, the three or more rings enclosing the ring-shaped arrangement of rolling elements such that a) an innermost of the rings has a race in contact with the rolling elements from radially inward, an outermost of the rings has a race in contact with the rolling elements from radially outward, and a third ring, and possibly a fourth ring, has or have a race or races in contact with the rolling elements axially from both sides, or b) the three or more rings have four races contacting the rolling elements in a rectangular box formation, the box formation being oriented at an oblique angle with respect to the central axis of between 0° and 360°, wherein two either radially or axially opposed races have structures with different spatial frequencies that are designed to force the rolling elements into a harmonic-wave type oscillation between the structured races and translating a fast rotation of a ring with a structured race having a low spatial frequency into a slow rotation of a ring having a race with a high spatial frequency during operation of the bearing, wherein the ring or one of the rings that has or have the races that are oriented perpendicular to the structured races has separators separating adjacent rolling elements from one another, which is further developed in that at least one of the structured races is structured such as to form an obstruction having at least one curve oscillating in a direction perpendicular to the direction of the rolling elements and contacting the rolling elements off-center such that the rolling elements partially protrude beyond the obstruction by varying amounts.

The solution of replacing one or both of the solid structured races with a race structured such as to form an obstruction that contacts the rolling elements off-center allows the structured race to be constructed using less space, since the rolling elements will project or protrude beyond the obstruction into the ring having the structured race and therefore shares some of the space with the ring. The race may have the oscillating curve on only one side, provided that a movement of the rolling elements, in particular balls, in the direction of the oscillation is prohibited. The race may also have two oscillating curves with their oscillations mirroring each other, i.e., having a relative phase shift of 180° to each other, and contacting the rolling elements on opposite sides of the central part of the surface of the rolling elements that protrude beyond the obstruction. Instead of ball-shaped rolling elements, rolling elements of generally cylindrical shape may be used, that in particular have rounded end faces.

The oscillating nature of the curve or of the curves of the obstruction has the effect of pushing the rolling elements out in the narrow parts of the obstruction and allowing the rolling elements to protrude through the obstruction further in the wider parts of the obstruction. When the rolling elements are moved along the obstruction, they are alternatingly accepted into and pushed out of the obstruction, thereby exhibiting in oscillating movement perpendicular to the plane spanned by the oscillating curve or curves. Such oscillating movement of the rolling elements may be a radial oscillation in cases where the obstruction is part of the race that contacts the rolling elements from radially inside or outside, whereas the rolling elements will oscillate in an axial direction of the bearing if the race having the obstruction is located axially towards the rolling elements.

The fact that the ring of rolling elements is contacted from radially inside and outside as well as from both sides axially gives rise to the functionality of the bearing as a ready radiaxial bearing equipped to bear forces in the radial as well as in the axial direction.

In a second embodiment, the improvements are also achieved by a radiaxial bearing having a cylindrical configuration centered on a central axis, the bearing having at least one harmonic wave-type reduction stage and including three or more rings and a first ring-shaped arrangement of rolling elements, each being centered on the central axis, the three or more rings enclosing the ring-shaped arrangement of rolling elements such that an inner most of the rings has a race in contact with the rolling elements from radially inward, an outermost of the rings has a race in contact with the rolling elements from radially outward, and a third ring, and possibly a fourth ring, has or have a race or races in contact with the rolling elements axially from both sides, wherein two radially or axially opposing races have structures with different spatial frequencies that are designed to force the rolling elements into a radial harmonic-wave type oscillation between the structured races and translating a fast rotation of a ring with a structured race having a low spatial frequency into a slow rotation of a ring having a race with a high spatial frequency during operation of the bearing, wherein the ring or one of the rings that has or have the races that are oriented perpendicular to the structured races has separators separating adjacent rolling elements from one another, wherein in particular at least one of the structured races is structured such as to form an obstruction having at least one curve oscillating in a direction perpendicular to the direction of the rolling elements and contacting the rolling elements off-center such that the rolling elements partially protrude beyond the obstruction by varying amounts, wherein the radiaxial bearing is further developed in that the bearing is a multi-row bearing having two or more rows of rolling elements in one reduction stage or a multi-stage bearing having two or more reduction stages with one or more rows of rolling elements each.

The provision of two or more rows of rolling elements in one reduction stage strengthens the bearing capability of the bearing and allows for a smooth reduction action under great force, in particular, if the two rows of rolling elements are provided with structured races having the same reduction factors.

In an embodiment of the radiaxial bearing having at least one reduction stage with two or more rows of rolling elements, the obstructions for the two or more rows of rolling elements have oscillating curves with the same spatial frequency but different phases. This offset by the phase shift of the respective oscillations serves to better distribute the load acting on the bearing and the reduction stage.

Likewise, the provision of two or more reduction stages with one or more rows of rolling elements each enhances the versatility of such radiaxial bearings, both in terms of bearing strength and in terms of achievable reduction ratio. Such multi-row or multi-stage bearings may be provided with the oscillating curve limited obstructions according to the first embodiment.

In embodiments, the two opposing structured races are the radially inward and radially outward contacting races and the harmonic wave-type oscillation is an oscillation of the rolling elements in the radial direction. In alternative embodiments, the two opposing structured races are the axially opposed contacting races and the harmonic wave-type oscillation is an oscillation of the rolling elements in the axial direction. Both configurations, which are according to the configuration a) of the radiaxial bearing, provide good stability and reduction actions. The first alternative having a radial oscillation of the rolling elements may be preferred if an axially compact design is called for, whereas the second alternative having an axial oscillation of the rolling elements can be designed with a smaller diameter. Furthermore, it is up to the individual design which of the rings will be used as input, as output or as fixed ring attached to another structure or motor. Also, the design which of the two rings with structured races has the structure with a higher number of oscillations is dependent on the design. In case of a reduction of the turning rate, the input side will be the ring with a low number of peaks or oscillations and the output side will be either the ring with a high number of oscillations or the ring with the separators for the rolling elements, the respectively other ring being the fixed ring.

Instead of an oscillation in the radial or axial direction (i.e., at 0°, 90°, 180°, 270°, 360°), another embodiment provides that the harmonic wave-type oscillation is an oscillation of the rolling elements in a direction having the oblique angle of alternative b) with respect to the central axis, which in this case excludes the purely radial or axial directions of alternative a). This configuration according to alternative b) of the radiaxial bearing may be more difficult to manufacture, but by providing the bearing races and the oscillation at oblique angles, it is well suited to combine axial and radial bearing functionality and to balance the axial and radial bearing capability according to design need, depending on the sizes of the expected radial and axial forces to be absorbed by the bearing.

In embodiments of the radiaxial bearing, a rim or rims of the obstruction of oscillating shape contacting the rolling elements off-center is or are constituted as one of opposing edges of a gap between two parts of the respective ring,
  an edge of the respective ring and
  oscillatingly bent wires.

Preferably, the two parts of the ring and/or the oscillatingly bent wires are held together by a recessed part of the ring.

The gap may be present in between two parts of one ring that may be connected with each other directly, or alternatively via another ring holding the two parts together. The gap is defined by the two oscillating curves having the same oscillating frequency circumferentially, but opposite phases, so that the gap opens up and closes tighter again on both sides simultaneously.

The alternative of one edge of the respective ring means that there is only one oscillating edge limiting the movement of the rolling elements, which are otherwise held in place in any direction transvers to the direction of oscillation, which may change with the progression of the rolling elements around the central axis in the case of a radial oscillation of the rolling elements.

The alternative of oscillatingly bent wires held in place with another ring provides a simple and cost-effective solution for manufacturing oscillating curves that facilitate the concept of the obstruction with oscillating width.

In embodiments, the ring or one of the rings that has or have the races that are oriented perpendicular to the structured races has separators separating adjacent rolling elements from one another.

In embodiments, the ring or the rings having the races oriented perpendicular to the structured races have cylindrical openings housing the rolling elements such that the rolling elements are able to move along the axes of the openings, the walls of the openings constituting the separators and the races oriented perpendicular to the structured races. Cylindrical openings assure a tight hold of the rolling elements, which in the simplest configuration are constituted as balls, allowing them movement in the direction of the orientation of cylindrical openings, but no or negligible play in any transverse direction. In this case, it is sufficient to have an oscillating curve only on one side of the structured race, since any sideways motion of the rolling elements away from the oscillating curve is blocked by the walls of the cylindrical opening. For this reason, the amplitude of the oscillation of the rolling elements is to be held such that they do not protrude out of the cylindrical openings.

In an embodiment, in a case of oscillation of the rolling elements in the radial direction, one of the radially inward structured race and the radially outward structured race is constituted of a pair of rings or wires with radially eccentric outer shape having one or two peaks, each contacting the rolling elements off-center.

In a further embodiment, in a case of oscillation of the rolling elements in the axial direction, the ring having the curve oscillating in the radial direction is constituted of two or more parts that are assembled in a circumferential opening of the ring or rings having the races perpendicular to the structured races such as to be secured against axial displacement.

In another embodiment, in a case of oscillation of the rolling elements in the axial direction, a structured race opposing another structured race having the curve oscillating in the radial direction is constituted as a surface with a flat plane having an inclination with respect to a plane perpendicular to the central axis or with a wave structure with two or three peaks resulting in axial displacement of the rolling elements during rotation of the surface around the central axis. A flat plane that is tilted with respect to the central axis has one peak in the axial direction. A wave structure can provide more than one peak in this case.

Further characteristics of the inventions disclosed herein will become apparent from the description of the preferred embodiments together with the claims and the included drawings. Embodiments can fulfill individual characteristics or a combination of several characteristics.

BRIEF DESCRIPTION OF THE DRAWINGS

Without restricting the inventions disclosed and claimed herein, reference is hereby made to exemplary embodiments shown in the drawings which further disclose details that may not be explained in greater detail in the text. The drawings show in:

6

Figure 3:
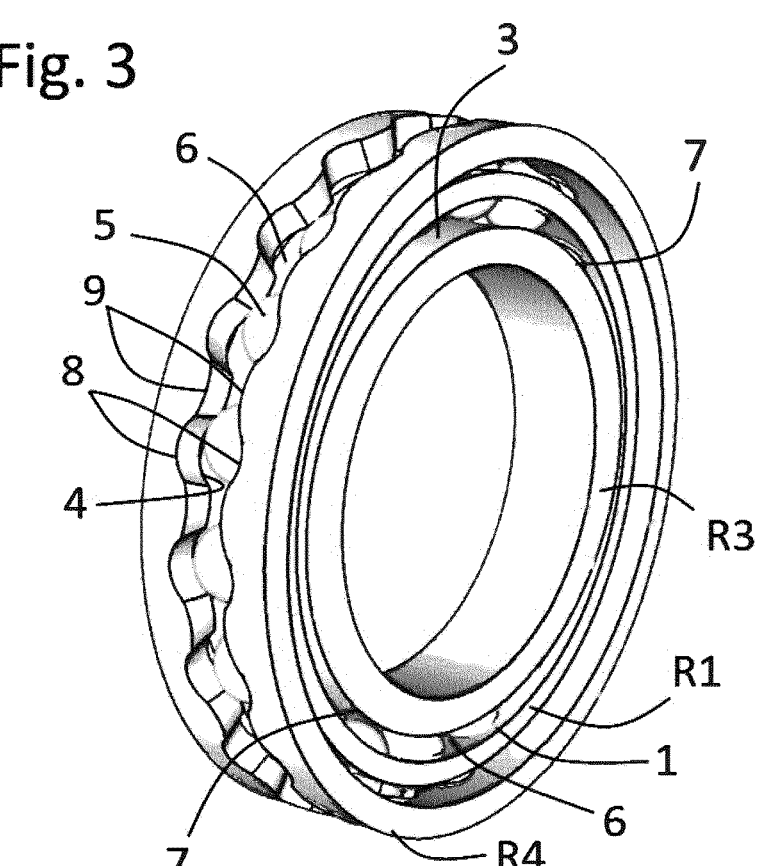
Figure 4:
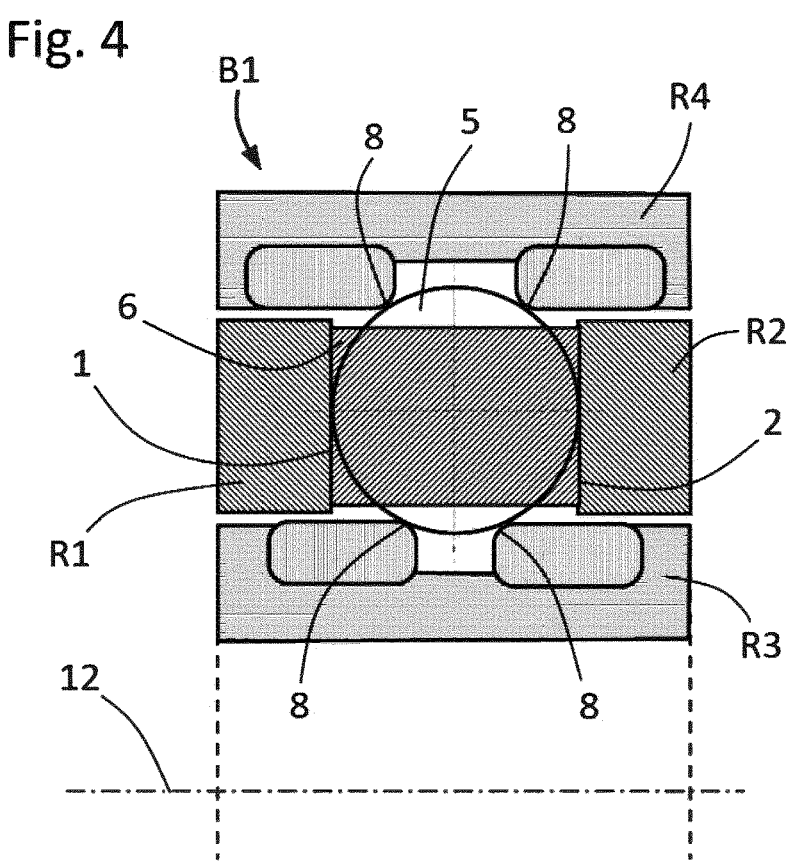
Figure 5:
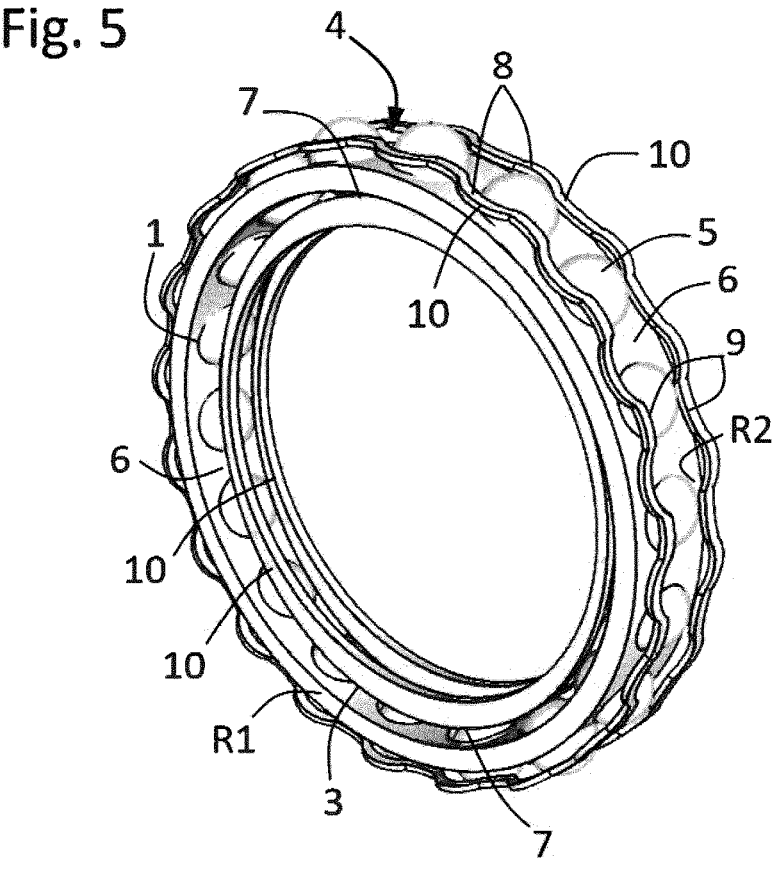
Figure 6:
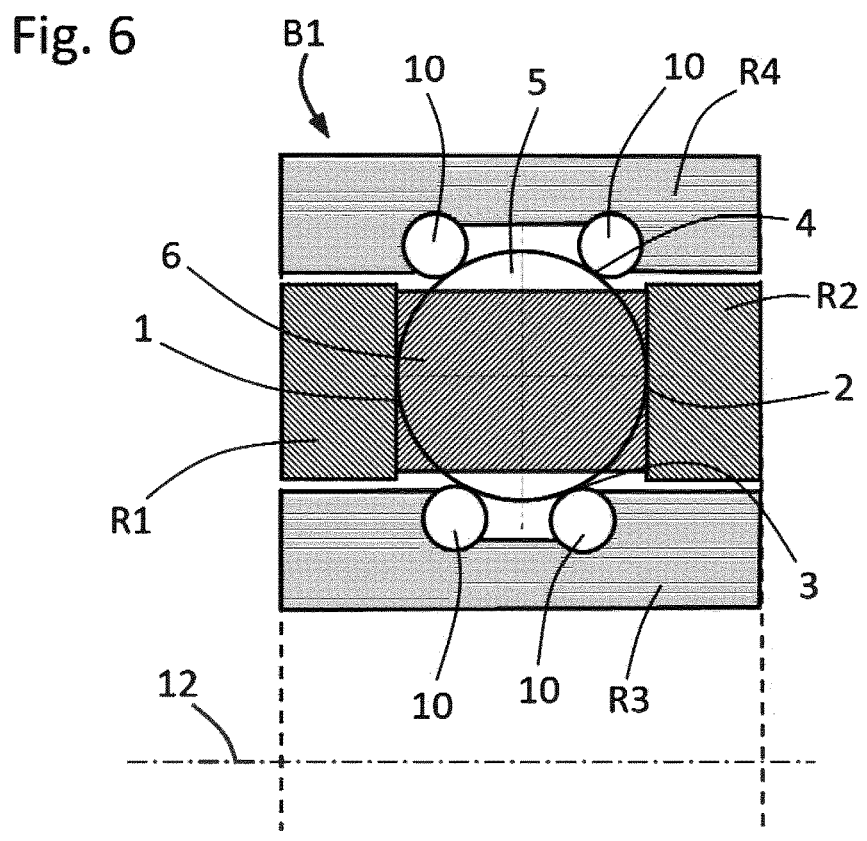
Figure 7:
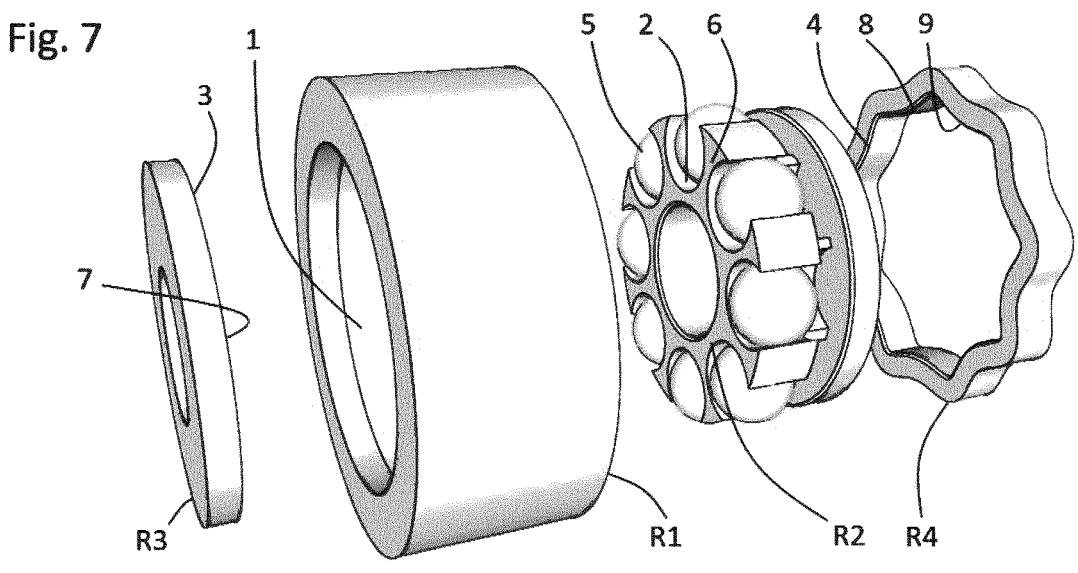
Figure 8:
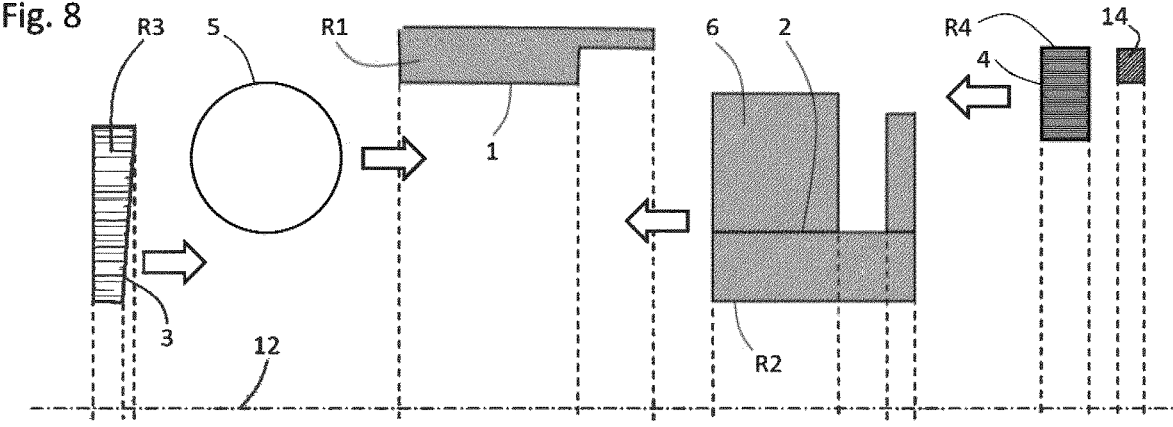
Figure 9:
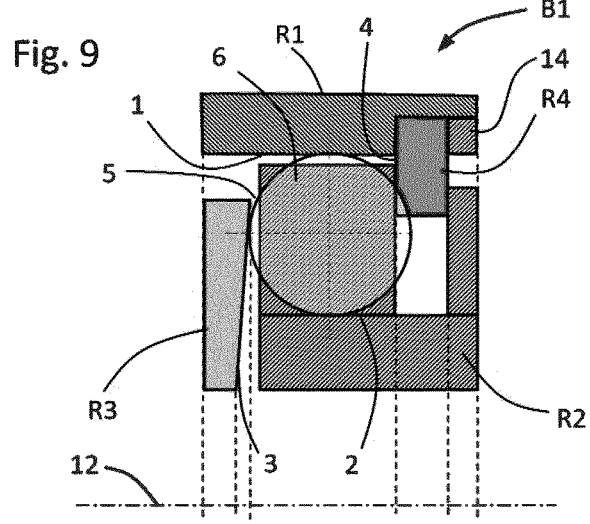
Figure 10:
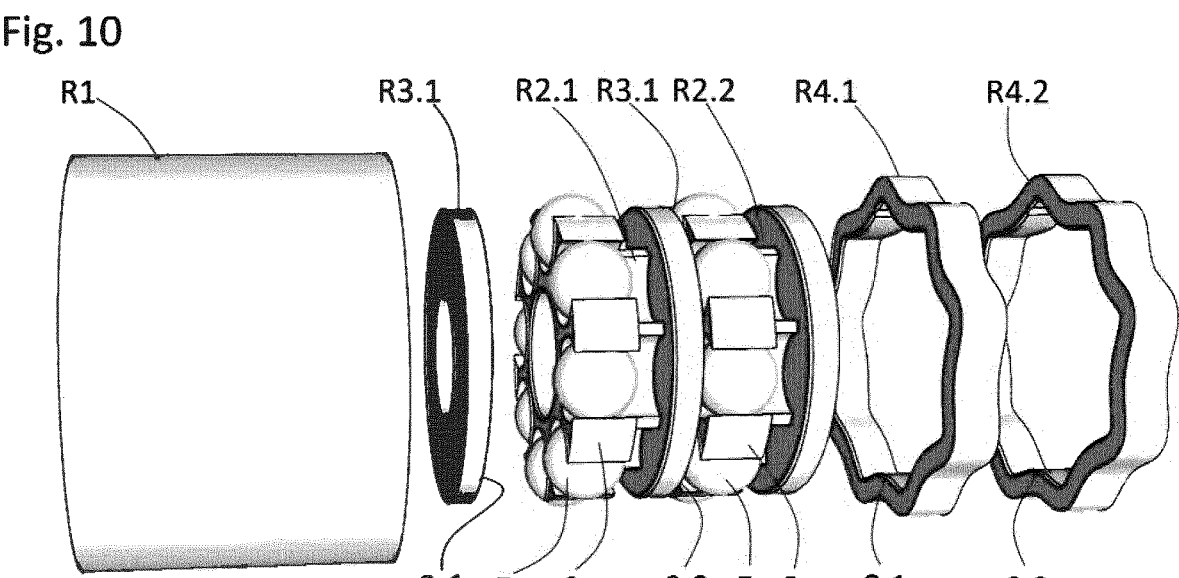
Figure 11:
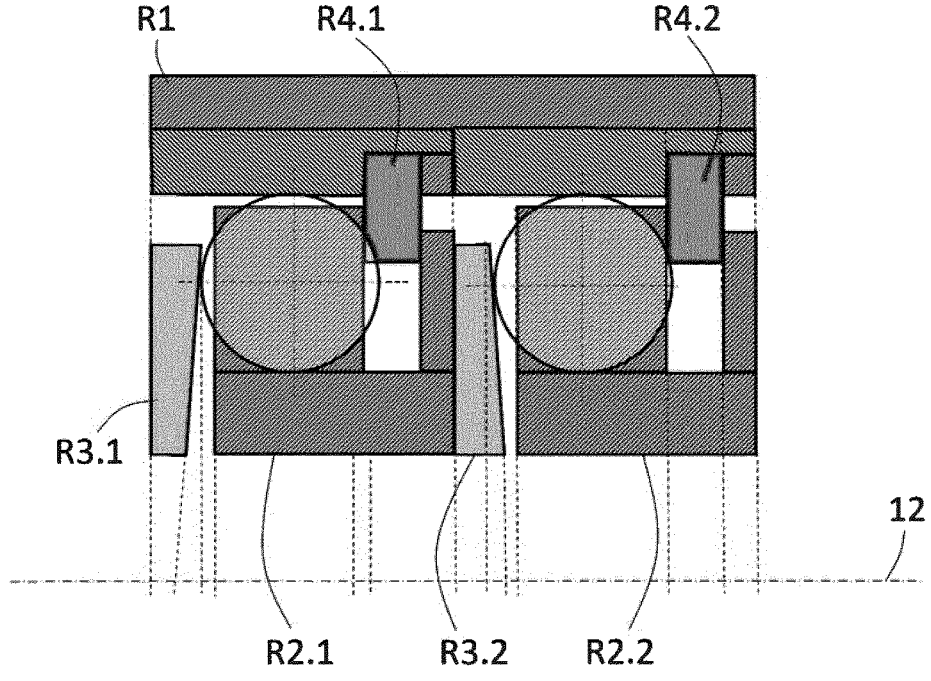
Figure 12:
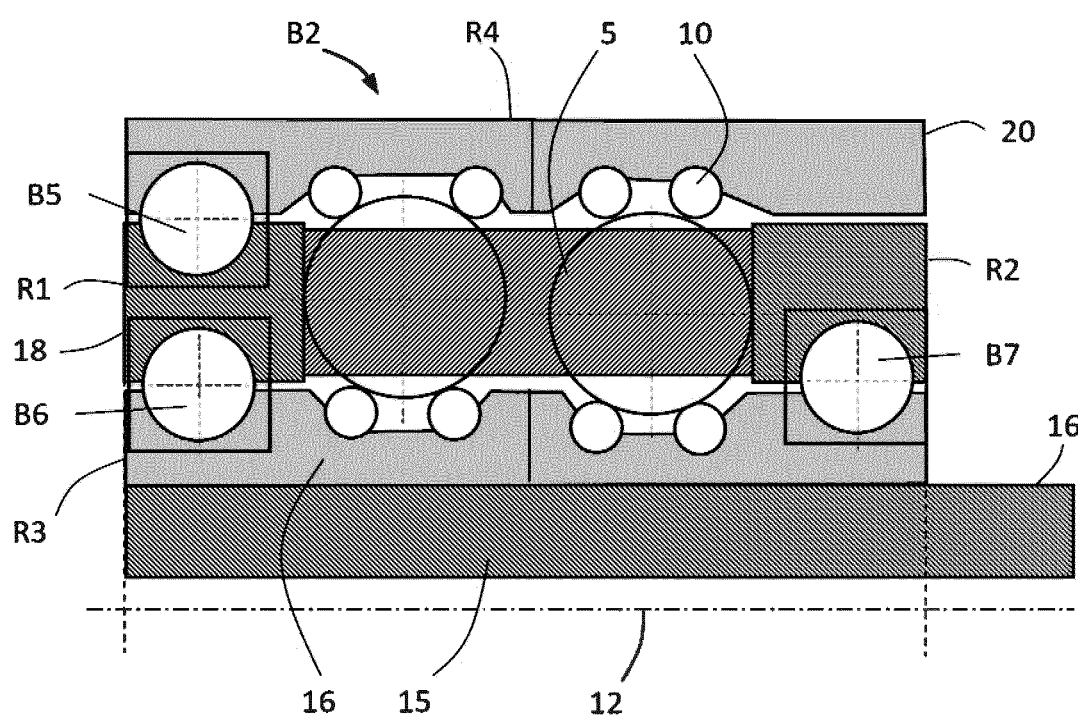
Figure 13:
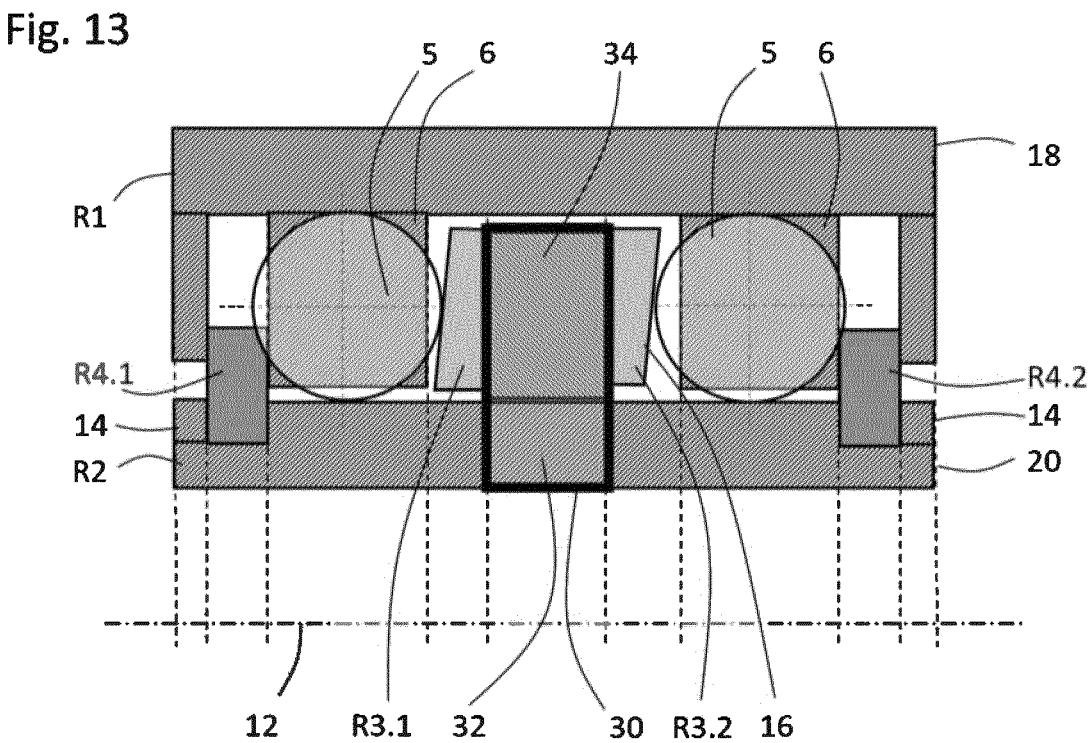
Figure 14:
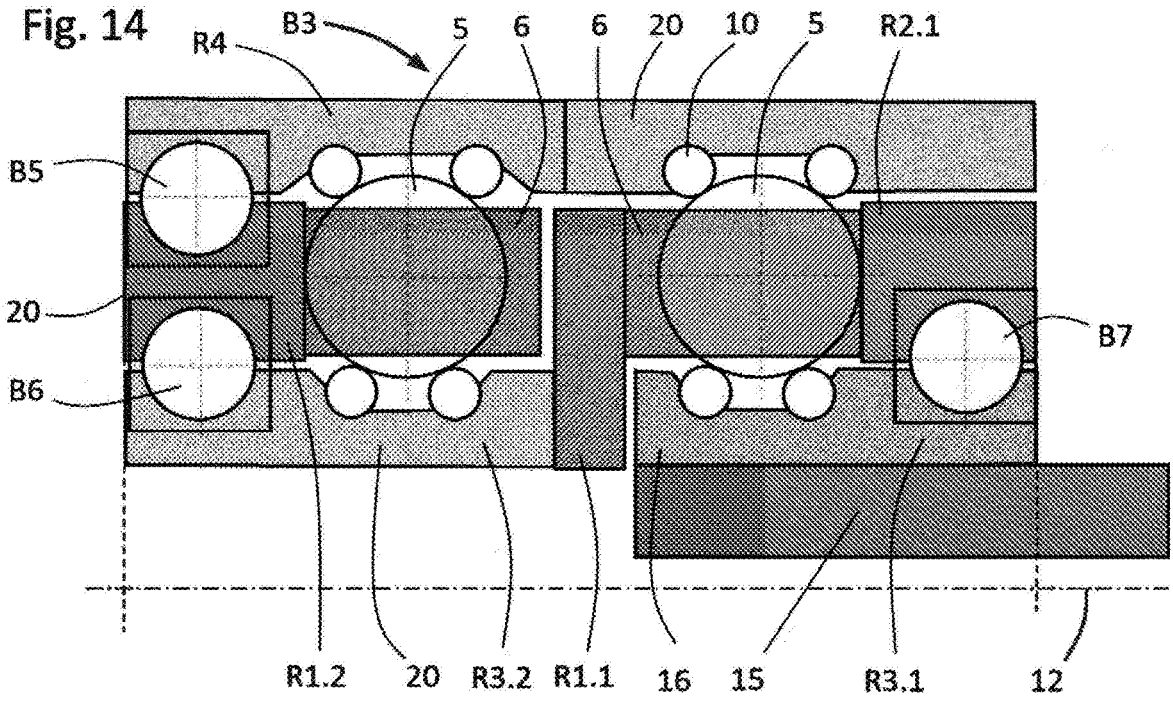
Figure 15:
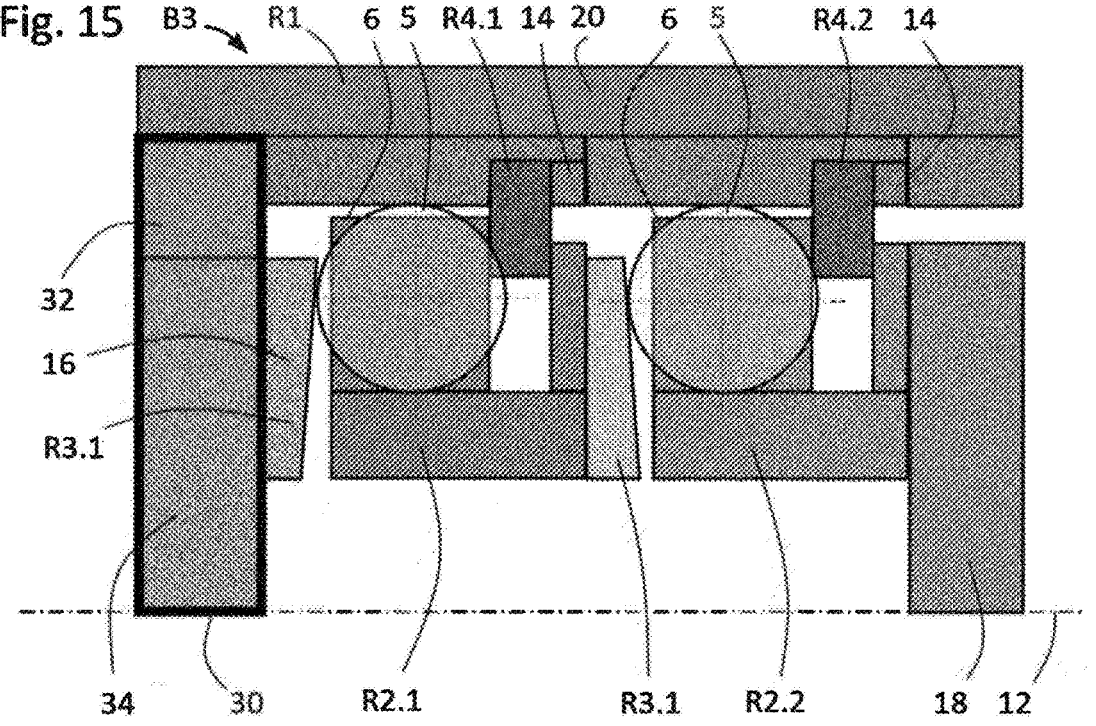

FIG. 1 a schematic perspective view of a known harmonic wave reduction stage;

FIG. 2.1 a schematic cross-sectional representation of the principal arrangement of rings of a radiaxial bearing with radial oscillation of rolling elements;

FIG. 2.2 a schematic representation of the principal arrangement of rings of a radiaxial bearing with axial oscillation of rolling elements, FIG. 3 a schematic perspective view of a first embodiment of a reduction stage of a radiaxial bearing;

FIG. 4 a schematic cross-sectional representation of a second embodiment;

FIG. 5 a schematic perspective view of a third embodiment of a reduction stage of a radiaxial bearing;

FIG. 6 a schematic cross-sectional representation of the third embodiment;

FIG. 7 a schematic perspective exploded view of a fourth embodiment of a reduction stage of a radiaxial bearing;

FIG. 8 a schematic cross-sectional representation of the fourth embodiment in exploded view;

FIG. 9 a schematic cross-sectional representation of the fourth embodiment in an assembled state;

FIG. 10 a schematic perspective view of a fifth embodiment of a reduction stage of a radiaxial bearing;

FIG. 11 a schematic cross-sectional representation of the fifth embodiment;

FIG. 12 a schematic cross-sectional representation of a sixth embodiment;

FIG. 13 a schematic cross-sectional representation of a seventh embodiment;

FIG. 14 a schematic cross-sectional representation of an eighth embodiment;

FIG. 15 a schematic cross-sectional representation of an ninth embodiment; and

Figure 16:
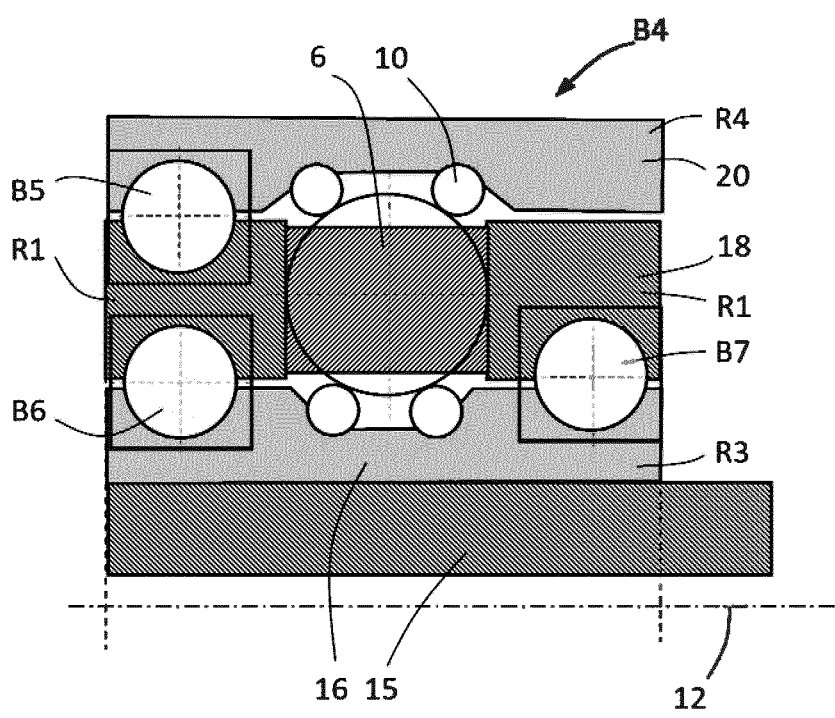

FIG. 16 a schematic cross-sectional representation of a tenth embodiment of a radiaxial bearing.

In the drawings, the same or similar types of elements or respectively corresponding parts are provided with the same reference numbers in order to prevent the item from needing to be reintroduced.

DETAILED DESCRIPTION OF THE INVENTION

FIG. 1 shows a schematic perspective representation of a known three-ring harmonic wave-type reduction stage of a radial bearing B1, shown here primarily with the purpose of explaining the mechanics of the harmonic wave-type reduction action.

The reduction stage contains three concentrically arranged rings R1, R3 and R4. The intermediate ring R1 has 19 cylindrical openings housing one rolling element 5 each, which in this case are ball-shaped. The radially outward facing surface of inner ring R3 constitutes a race 3 with an elliptical shape with two peaks 7. The radially inward facing surface of outer ring R4 constitutes a race 4 with a curve 8 having a larger number of peaks 9 and valleys, in this case 20 each. The exact curvatures of the structured races 3, 4 are calculated and designed such that the rolling elements 5 are always in contact with both races.

When the inner ring R3 is driven to rotate, its elliptical race 3 displaces the rolling elements 5 radially, pushing them into the valleys of the opposing race 4, at each pass of a peak 7 of race 3, thereby also inducing a movement of the rolling elements 5 in the circumferential direction. Because the number of rolling elements 5 is not exactly equal to the number of valleys in the race 4, the rolling elements 5 are caused to enter into the next successive valley in race 4 with each passing peak 7 on the inner race 3, thereby performing a combined radial oscillation and slow movement in the circumferential direction. The totality of the rolling elements 5 thereby moves in a harmonic wave. The fact that there are large differences in the number of peaks 7, 9 and valleys of the inner and outer rings R3, R4, respectively, and that the number of rolling elements 5 is only slightly different from the number of peaks 9 and valleys of ring R4 is typical for harmonic wave-type reduction races. The reduction ratio of the reduction stage is equal to the ratio of the number of peaks 7, 9 on the innermost and outermost rings R3, R4. In the case shown in FIG. 1, this reduction ratio is 10:1. Instead of two peaks 7, race 3 may have an eccentric shape with only one peak, or a small number of peaks, provided that this number is considerably lower than the number of peaks 9 and valleys in the opposing race 4, in particular not more than one half or one third of that number. Practical limits to the ratio of peaks in the opposing structured races are given by the smallness of the size in which the rolling elements 5 and the race 4 can be manufactured.

Based on the setup shown in FIG. 1, there are two possible configurations. In both configurations, the innermost ring R3 is rotatably driven by an external source, e.g., a drive shaft of an electric motor. In the first configuration, the outer ring R4 is fixed, and the intermediate ring R1 constitutes the output at reduced speed. In the second configuration, the intermediate ring R3 is fixed and the outer ring R4 is used as output. The orientation of the rotation of the output ring is reversed between the two configurations.

Harmonic wave-type reduction stages having several concentric rings mostly have one of two basic design options that are shown schematically in simplified cross-sectional representations in FIGS. 2.1 and 2.2. Both design options have in common that each rolling element 5 is caged in completely between races 1, 2, 3, 4 and separators 6 in the radial, axial and circumferential direction of the reduction stage without play inside their cages. The separators 6 separate successive rolling elements 5 from each other in the circumferential direction. They are part of a ring R1 or R2 or both, if rings R1 and R2 for a common unit. The other races 1, 2 of rings R1, R2 are flat, without structure. The races 1, 2 and the separators 6 may be realized as cylindrical openings in ring R 1, as shown in FIG. 1.

The two other races of rings R3, R4 are structured races 3, 4 that impose the harmonic wave-type oscillation on the rolling elements 5 when rotating relative to one another. The two configurations shown in FIGS. 2.1 and 2.2 differ in that in FIG. 2.1, the structured races 3, 4 of rings R3, R4 are disposed radially inside and outside of the rolling elements, so that the harmonic wave-type oscillation is oriented in the radial direction with respect to the central axis 12. This is the same orientation as shown in the bearing B1 of FIG. 1. In contrast, the configuration shown in FIG. 2.2 provides the structured races 3, 4 of rings R3, R4 in axial relation to the rolling elements 5, thereby imposing an axially oriented oscillation of the rolling elements 5 with no radial component. The radially abutting races 1, 2 are not structured.

FIG. 3 displays a schematic perspective view of a first embodiment of a reduction stage of a radiaxial bearing B1. In its basic configuration it is a radial oscillation-type reduction stage as shown in FIG. 2.1 and has a strong resemblance to the known reduction stage shown in FIG. 1. The innermost ring R3 again has an elliptical race 3 with two peaks 7 and the intermediate ring R1 is configured with cylindrical openings for rolling elements 5. The outermost ring R4, however, is basically a flat ring that is split into two parts with a gap in between the two parts. In the circumferential direction of ring R4, the gap has an oscillating width defined by the curves 8 of the opposing sides or rims of the gap, which has regularly spaced peaks 9 narrowing the gap width and opening gap widths in between the peaks 9. The maximum gap width is smaller than the overall diameter of the ball-shaped rolling elements 5 so that they are retained inside their respective cages.

The race 4 of ring R4 is made of the rims of the gap that contact the rolling elements 5 symmetrically and off-center. The rolling elements 5 protrude into the gap depending on the gap width at the position of the respective rolling elements 5. During the circumferential progression of the rolling elements 5 they encounter a varying gap width that causes them to oscillate in the radial direction of the reduction stage. The oscillating structures of the partial rings of ring R4 are easier to manufacture than the peaks and valleys on the inside of ring R4 in FIG. 1.

FIG. 4 shows a schematic cross-sectional representation of a second embodiment of a reduction stage of a radiaxial bearing B1, which is a variant of the first embodiment shown in FIG. 3. In the second embodiment of FIG. 4, the intermediate ring constitutes the rings R1 and R2, wherein the separator 6 is the bridge between the two sides. The rolling elements 5 are held between the separator 6 and the races 1 and 2 such that movement in the radial direction is possible, subject to contacting points in the radial direction. The innermost ring R3 and the outermost ring R4 alike are each split into two parts held together by a holding ring each, with a gap of varying width between the two parts each. The contact points of the rims of the ring parts define the curves 8, which are designed such that the rolling elements 5 are always contacted at four off-center points and protrude into the respective gap. By opening the gap on one side and narrowing the gap on the other side, the rolling element moves in the radial direction FIG. 4 and most of the following figures display the axial and vertical center lines of the rolling elements 5 as thin dashed lines. The contact points of the structured races are always off-center with respect to the relevant axial and/or vertical center line.

FIG. 5 shows a schematic perspective view of a third embodiment of a reduction stage of a radiaxial bearing with radial harmonic wave-type oscillation, which differs from the previous embodiments in the features defining the contact curves 8 of the innermost ring R3 and the outermost ring R4. Instead of a split ring with varying gap as in the second embodiment, the outer ring has two wires 10 that are bent into the shape of the curve 8. The innermost ring has another variation in the form of two identical rings that are displaced axially to and enclosing a gap between one another. The width of the gap is constant, but the thickness of the wires 10 or tracks, respectively, changes around the circumference and exhibits two peaks 7 at opposite sides to one another.

FIG. 5 does not show the complete innermost and outermost rings, since they would obstruct the view of the guiding wires 10. FIG. 6 is a schematic cross-sectional representation of the third embodiment of FIG. 5 and shows the more complete setup. As can be seen from FIG. 6, the wires 10 of the innermost ring R3 as well as those of the outer most ring R4 are held in place by solid rings R3, R4. Suitable means for connecting the wires 10 with the solid rings R3, R4 include soldering, welding or clamping. The bending of the wires 10 and the soldering or welding the wires 10 to the solid rings is a process that is much less involved than producing the peaks and valleys of the known reduction stage of FIG. 1.

FIG. 7 shows a schematic perspective exploded view of a fourth embodiment of a reduction stage of a radiaxial bearing, in this case the reduction stage having been axially directed oscillation of the rolling elements 5. FIGS. 8 and 9 show schematic cross-sectional representations of the fourth embodiment of FIG. 7 in an exploded view and in an assembled state. The arrows shown in FIG. 8 indicate the direction of movement of the various components of the reduction stage during assembly.

Four rings R1-R4 are again aligned on a central axis 12. From left to right, ring R3 has a surface constituting the race 3 that faces axially inward. The race 3 has one or more peaks 7. In the fourth embodiment, race 3 has one peak 7, since race 3 is a flat surface that is inclined at an oblique angle with respect to a plane that is orthogonal to the central axis 12 of the bearing. With each rotation of ring R3, the axial position of the contact points of race 3 will therefore vary in an oscillating manner with an amplitude defined by the diameter and the angle of inclination of race 3.

An outer enclosing ring R1 has a cylindrical inner surface constituting the structureless race 1. As shown in FIG. 9, the inner diameter of race 1 is larger than the outer diameter of ring R3 so that the latter is housed inside ring R1 in the assembled state. Axially opposite to ring R3, ring R2 is brought into ring R1 oriented such that a ring of rolling elements 5 faces race 3. Each rolling element 5 is housed inside a cylindrical opening inside ring R2 with the parts of ring R2 separating the cylindrical openings from each other constituting separators 6. The cylindrical openings are oriented axially such that the rolling elements 5 can move axially inside the cylindrical openings. The con-figuration of the ring of rolling elements 5 is such that diameter at the outer circumference is equal to the diameter of the inner circumference of race 1 of ring R1, thereby providing stability in the radial direction of the assembly. When contacting race 3 of ring R3, the rolling elements 5 are caused to shift axially within their respective cylindrical openings inside ring R2 with the same amplitude of axial movement as is provided by the peak 7 or peaks of race 3.

In the fourth embodiment shown in FIGS. 7 to 9, ring R2 has a second component, which is axially further removed from race 3 of ring R3. The second component is connected with the part of ring R2 featuring the cylindrical openings for the rolling elements 5 by a central connecting part having a smaller radial extension, thereby providing an axially oriented gap between the two parts of ring R2. This axial gap is used to receive ring R4, which has a radially oscillating shape constituting a curve 8 with a higher number of peaks 9 and valleys, in this case nine peaks and valleys each. Again, the number of rolling elements 5 is slightly smaller than the number of peaks 9 and valleys, namely eight. Given that race 3 has one peak, the reduction ratio of the reduction stage shown in FIG. 7 is 9:1.

The inner rim of ring R4 constitutes a race 4 of the reduction stage. In this embodiment, there is only one curve 8 contacting the rolling elements off-center. Movements transverse to the axial direction are, however, prohibited by the cylindrical openings in ring R2 hosting the rolling elements 5. In this case, there is no gap of varying width as such, but the configuration serves the same purpose of restricting the axial movement of the rolling elements 5 in the known fashion of harmonic wave-type reduction stages. The radial orientation of the oscillation of curve 8 of race 4 is transverse to the axial orientation of the oscillation of rolling elements 5. This is a reversal of the orientations in the previous embodiments, where the axial orientation of the oscillations of the respective curves 8 of race 4 is transverse to the radial orientation of the oscillation of rolling elements 5.

Since, in the fourth embodiment, ring R4 is to be housed in the gap between the two parts of ring R2 and held in place axially inside that gap, ring R4 may comprise two halves or two parts in the circumferential direction that are put together after insertion of the two parts into the axial gap of ring R2. The assembly of the reduction stage shown in FIG. 7 is shown in FIG. 8 in a schematic cross-sectional representation of the fourth embodiment in exploded view. An additional component that is used for securing the assembly is a fixing ring 14 which abuts both ring R4 and the inside surface of ring R1.

The reduction stage is shown in FIG. 9 by means of a schematic cross-sectional representation of the fourth embodiment in an assembled state. As can be seen both in FIG. 8 and FIG. 9, the outer ring R1 has two contiguous parts separated by a step in the inner diameter of the opening. The opening inside ring R1 with the smaller diameter is the part facing ring R3 and hosting the rolling elements 5, presenting them with race 1. The part of ring R1 having the larger inner diameter houses ring R4, which is axially fixed by abutting against the step between the two parts of ring R1 on one side and is clamped in by the fixing ring 14 on the opposite side. Ring R4 being axially fixated as it is between the step in R1 and the fixing ring 14, ring R2 is also axially fixed, because ring R2 houses ring R4 within its axial gap without axial play. Circumferential movement of rings R2 and R4 relative to each other is assured.

FIGS. 10 and 11 display a schematic perspective view and a schematic cross-sectional representation of a fifth embodiment of a reduction stage of a radiaxial bearing. This fifth embodiment is based on the fourth embodiment shown in FIGS. 7 to 9. In contrast to the fourth embodiment, the fifth embodiment is an example of a two-stage reduction bearing with two basically identical single-row reduction stages connected in series. The input is given by ring R3.1, which is driven by an external motor (not shown) and rotated around the central axis 12. Race 3.1 of ring R3.1 is a flat surface tilted at an oblique angle with respect to a plane that is orthogonal to the central axis 12. Thereby, race 3.1 of ring R3.1 has one peak in the axial direction.

Ring R1 is fixed to an external structure (not shown), so that rings R4.1 and R4.2 of the first and second stages are fixed, too. Ring R2.1 of the first stage is driven by the axial movement of rolling elements 5 prompted by the rotation of ring R3.1 at a reduced revolving rate given by the ratio of peaks in rings R4.1 and R3.1, respectively. In the present embodiment, this reduction ratio is 9:1, meaning that 9 revolutions of ring R3.1 result in one full revolution of ring R2.1.

The input of the second stage is ring R3.2, which is connected to and rotatably driven by ring R2.1, the output of the first stage. FIG. 10 shows rings R4.1 and R4.2 as having the same spatial orientation. The second stage has a reduction ratio of 9:1 as well, its output is ring R2.2. The total reduction ratio is 81:1, meaning that 81 revolutions of ring R3.1 result in one full revolution of ring R2.2. The races 3.1 and 3.2 of rings R3.1 and R3.2 are flat surfaces tilted at the same oblique angles, providing structural symmetry. However, the tilting angles of races 3.1 and 3.2 may differ, as may the number of peaks in the curves 8.1 and 8.2, which in any case may have any phase relation.

FIG. 12 is a schematic cross-sectional representation of a sixth embodiment of a radiaxial reduction bearing B2 that constitutes a single-stage, two-row reduction stage. Each of the two rows is built in the same way the wire 10 based single stage reduction bearing B1 of FIG. 6. A phase shift between the two rows is again realized in order to guarantee a smooth operation of the bearing. It can be seen that in the cross-section shown in FIG. 12, the two rolling elements 5 are in different radial positions due to the phase shift between the two stages provided by the different phases of the races in rings R3 and R4. The phase shift ensures a proper distribution of loads and smooth action of the reduction stage of bearing B2.

The radiaxial bearing B2 has reinforcement bearings B5, B6 and B7 providing enhanced stability and loading capacity in both the radial and the axial direction and is driven by a motor shaft 15 inputting a radial movement around central axis 12 to ring R3. The rolling elements 5 are held in their respective openings or cages in an intermediate ring, which is a combined ring R1 and R2. The output may be either bring R4, if rings R1, R2 are fixed to an external structure, or vice versa.

FIG. 13 shows a schematic cross-sectional representation of a seventh embodiment representing a single-stage two-row reduction stage constructed around an electric motor 30 having a stator 32 and a rotor 34. The harmonic wave-type oscillation design principle is the same as shown in the embodiments of FIGS. 7 to 11 with an axial oscillation of the rolling elements 5. In this embodiment, the electric motor 30 is positioned centrally with the innermost ring R2 attached to its stator 32 and two rings R3.1 and R3.2 attached to one side each of its rotor 34. Ring R2 is thereby fixed along with the stator 32 of motor 30. Rings R3.1 and R3.2 have tilted races with one peak per revolution, offset by 180° to each other. Two rings R4.1 and R4.2 are located axially opposite to rings R3.1 and R3.2, respectively, and are secured against ring R2 by fixing rings 14. The rings R3.1 and R3.2 may be structured as shown, for example, in FIG. 7. In the embodiment of FIG. 13, however, it is the outer rims of rings R4.1 and R4.2 facing the rolling elements 5 instead of the inner rims that are used as races for the harmonic wave-type oscillation action of the rolling elements 5.

The outermost ring R1 includes the separators 6 between the adjacent rolling elements 5 in the circumferential direction and is thereby the output of the reduction stage. Again, the phase shift of 180° between the two rows assures a load balanced and smooth action of the reduction stage.

In FIG. 14 an eighth embodiment is shown in a schematic cross-sectional representation. The eighth embodiment is a two-stage radial oscillation-type reduction stage radiaxial bearing B3 with reinforcement bearings B5, B6 and B7 providing additional stability and load-bearing capability. The structured races of rings R3, R4 in this embodiment are made up of wires 10, in the manner shown in FIGS. 5, 6 and 12. The motor shaft 15 drives input 16, which is ring R3.1 of the first reduction stage. Ring R4 is common to both production stages and affixed to an external structure, for example the housing of an electric motor (not shown) driving the motor shaft 15. First stage rings R 1.1 and R2.1, which are connected via the separators 6 between the rolling elements 5, serve as the output of the first stage, which is connected with input ring R3.2 of the second reduction stage. Ring R1.2 is the output of the second reduction stage and the harmonic wave-type reduction part of bearing B3.

FIG. 15 displays a schematic cross-sectional representation of a ninth embodiment. The ninth embodiment is a two-stage radial oscillation-type reduction stage radiaxial bearing B3 as shown in the fifth embodiment in FIGS. 10 and 11. In the ninth embodiment, ring R3.1 serves as the input 16 and is attached to the rotor 34 of an electric motor 30, whose stator 32 is attached to ring R1, which is fixed and common to the two reduction stages. The rotating parts are the rotor 32 of the electric motor 30, the ring R3.1 attached to the rotor, ring R2.1 with ring R3.1 as output of the first stage and input of the second stage and ring R2.2 as output 18 of the second stage.

FIG. 16 shows a schematic cross-sectional representation of a tenth embodiment of a radiaxial bearing B4, which in its essence is the reduction stage of bearing B1 of the third embodiment shown in FIG. 6, with additional reinforcement bearings B5, B6 and B7 providing additional stability and bearing load capacity and wherein the inner-most ring R3 serves as input 16 driven by the motor shaft 15 of an electric motor (not shown). Ring R4 is the fixed component 20, whereas ring R1 with the separators 6 serves as output 18, being driven by the circumferential motion of the rolling elements 5 in their radial harmonic wave-type oscillation around central axis 12.

All named characteristics, including those taken from the drawings alone, and individual characteristics, which are disclosed in combination with other characteristics, are considered alone and in combination as important to the inventions disclosed and claimed herein. Embodiments according to the invention can be fulfilled through individual characteristics or a combination of several characteristics. Features which are combined with the wording "in particular" or "especially" are to be treated as preferred embodiments.

LIST OF REFERENCES CHARACTERS
APPEARING IN THE DRAWING FIGURES

1 race
2 race
3, 3.1, 3.2 bearing race
4 bearing race
5 rolling element
6 separator
7 peak
8, 8.1, 8.2 curve
9 peak
10 profiled wire
12 central axis
14 fixing ring
15 motor shaft
16 input
18 output
20 fixed component
30 motor
32 stator
34 rotor
B1 bearing
B2 multi-row bearing
B3 multi-stage bearing
B4 reinforced bearing
B5-B7 reinforcement bearings
R1, R1.1, R1.2 ring
R2, R2.1, R2.2 ring
R3, R3.1, R3.2 ring
R4, R4.1, R4.2 ring

What is claimed is:
1. A radiaxial bearing having a cylindrical configuration centered on a central axis, the bearing having at least one reduction stage comprising:
three or more rings; and
a first ring-shaped arrangement of rolling elements;

wherein each of the three or more rings and the first ring-shaped arrangement of rolling elements are centered on the central axis, wherein the three or more rings enclose the ring-shaped arrangement of rolling elements such that a) an innermost of the three or more rings has a race in contact with the rolling elements radially inward toward the central axis, an outermost of the three or more rings has a race in contact with the rolling elements radially outward away from the central axis, and a third ring of the three or more rings has a race in contact with the rolling elements axially from both sides, or b) the three or more rings have four races contacting the rolling elements in a rectangular box formation, the box formation being oriented at an oblique angle with respect to the central axis of between 0° and 360°, wherein either two radially opposed races or two axially opposed races are provided with structures with different spatial frequencies, respectively, such that the rolling elements are forced into oscillation between the two radially opposed races or the two axially opposed races during operation of the bearing thereby slowing rotation of one of said three or more rings including the race provided with structures having a lower spatial frequency as compared to rotation of another one of said three or more rings including the race provided with structures having a higher spatial frequency, wherein at least one of said three or more rings has or have races that are oriented perpendicular to the either two radially opposed races or the two axially opposed races that are provided with structures with different spatial frequencies, wherein the at least one of said three or more rings that has or have races that are oriented perpendicular to the either two radially opposed races or the two axially opposed races that are provided with structures with different spatial frequencies has or have separators separating adjacent rolling elements from one another, and wherein at least one of the races is provided with a structure that forms an obstruction having at least one curve oscillating in an axial direction perpendicular to a radial direction and a circumferential direction of the bearing thereby contacting the rolling elements off-center such that the rolling elements partially protrude beyond the obstruction by varying amounts.

2. The radiaxial bearing according to claim 1, wherein the bearing includes at least four rings, and wherein the at least four rings enclose the ring-shaped arrangement of rolling elements such that an innermost of the at least four rings relative to the central axis has a race in contact with the rolling elements radially inward toward the central axis, an outermost of the at least four rings has a race in contact with the rolling elements radially outward away from the central axis, and at least a third ring and a fourth ring have races in contact with the rolling elements axially from both sides.

3. The radiaxial bearing according to claim 1, wherein the bearing is a multi-row bearing having two or more rows of rolling elements in one reduction stage or a multi-stage bearing having two or more reduction stages with one or more rows of rolling elements each.

4. The radiaxial bearing according to claim 3, wherein the bearing has at least one reduction stage with two or more rows of rolling elements, and wherein the obstructions for the two or more rows of rolling elements have oscillating curves with the same spatial frequency but different phases.

5. The radiaxial bearing according to claim 1, wherein the two opposing races provided with structures with different spatial frequencies are radially inward and radially outward contacting races, and wherein the oscillation is an oscillation of the rolling elements in the radial direction.

6. The radiaxial bearing according to claim 1, wherein the two opposing structured races are axially opposed contacting races and the oscillation is an oscillation of the rolling elements in the axial direction.

7. The radiaxial bearing according to claim 1, wherein the oscillation is an oscillation of the rolling elements in a direction having the oblique angle with respect to the central axis.

8. The radiaxial bearing according to claim 1, wherein a rim or rims of the structure that forms the obstruction having at least one curve oscillating in the direction perpendicular to the direction of rotation of the rolling elements thereby contacting the rolling elements off-center is or are constituted as one or more of:

opposing edges of a gap between two parts of the respective ring;

an edge of the respective ring; and oscillatingly bent wires.

9. The radiaxial bearing according to claim 8, wherein the two parts of the respective ring and/or the oscillatingly bent wires are held together by a holding ring.

10. The radiaxial bearing according to claim 1, wherein the ring or one of the rings that has or have the races that are oriented perpendicular to the structured races has cylindrical openings housing the rolling elements such that the rolling elements are able to move along axes of the opening, walls of the openings constituting the separators and the races oriented perpendicular to the structured races.

11. The radiaxial bearing according to claim 1, wherein in a case of oscillation of the rolling elements in the radial direction, one of the radially inward structured race and the radially outward structured race is constituted of a pair of rings or wires with a radially eccentric outer shape having one or two peaks, each contacting the rolling elements off-center.

12. The radiaxial bearing according to claim 1, wherein in a case of oscillation of the rolling elements in the axial direction, the ring having the curve oscillating in the radial direction is constituted of two or more parts that are assembled in a circumferential opening of the ring or rings having the races perpendicular to the structured races such as to be secured against axial displacement.

13. The radiaxial bearing according to claim 1, wherein in a case of oscillation of the rolling elements in the axial direction, a structured race opposing another structured race having the curve oscillating in the radial direction is constituted as a surface with a flat plane having an inclination with respect to a plane perpendicular to the central axis or with a wave structure with two or three peaks resulting in axial displacement of the rolling elements during rotation of the surface around the central axis.

14. An electric motor, wherein at least one radiaxial bearing according to claim 1 is integrated with or into the electric motor, wherein a casing of the electric motor forms a supporting structure for the radiaxial bearing, and a rotor of the electric motor is drivingly connected to or integral with an input of the radiaxial bearing.

* * * * *